(12) United States Patent
Kahlon et al.

(10) Patent No.: US 8,527,976 B2
(45) Date of Patent: Sep. 3, 2013

(54) SYSTEM AND METHOD FOR GENERATING ERROR TRACES FOR CONCURRENCY BUGS

(75) Inventors: Vineet Kahlon, Princeton, NJ (US); Sriram Sankarnarayanan, Plainsboro, NJ (US); Aarti Gupta, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1257 days.

(21) Appl. No.: 12/241,340

(22) Filed: Sep. 30, 2008

(65) Prior Publication Data

US 2009/0125887 A1 May 14, 2009

Related U.S. Application Data

(60) Provisional application No. 60/987,797, filed on Nov. 14, 2007.

(51) Int. Cl.
*G06F 9/45* (2006.01)
(52) U.S. Cl.
USPC ............ 717/152; 717/124; 717/126; 717/127
(58) Field of Classification Search
None
See application file for complete search history.

(56) References Cited

U.S. PATENT DOCUMENTS

2002/0147969 A1* 10/2002 Lethin et al. .................. 717/138
2007/0006015 A1* 1/2007 Rao et al. .......................... 714/4

OTHER PUBLICATIONS

VineetKahlon, et al., Fast and Accurate Static Data-Race Detectionfor Concurrent Programs, Computer Aided Verification, 19th International Conference, CAV 2007, Berlin, Germany, Jul. 2007, Proceedings, Jul. 2007, p. 226-239.

Guillaume Brat, et al., Combining Static Analysis and Model Checking for Software Analysis, Automated Software Engineering, 2001. (ASE 2001) Proceedings. 16th Annual International Conference on, Nov. 2001, p. 262-269.

* cited by examiner

*Primary Examiner* — Chuck Kendall
(74) *Attorney, Agent, or Firm* — Joseph Kolodka

(57) ABSTRACT

A system and method for program verification includes generating a product transaction graph for a concurrent program, which captures warnings for potential errors. The warnings are filtered to remove bogus warnings, by using constraints from synchronization primitives and invariants that are derived by performing one or more dataflow analysis methods for concurrent programs. The dataflow analysis methods are applied in order of overhead expense. Concrete execution traces are generated for remaining warnings using model checking.

13 Claims, 4 Drawing Sheets

```
void Alloc_Page() {                     void Dealloc_Page() {
a1:   pt_lock(&plk);                    b1:   pt_lock(&plk);
a2:   if(pg_count ≥ LIMIT){             b2:   if (pg_count == LIMIT) {
a3:      pt_wait(&pg_lim, &plk);        b3:      pt_send(&pg_lim, &plk);
a4:      pg_count++;                    b4:      pg_count--;
a5:      pt_unlock(&plk);               b5:      pt_unlock(&plk);
a6:   } else {                          b6:   } else{
a7:      lock(&count_lock);             b7:      lock(&count_lock);
a8:      pt_unlock(&plk);               b8:      pt_unlock(&plk);
a9:      page = alloc_page();           b9:      pg_count--;
a10:     if(page)                       b10:     unlock(&count_lock);
a11:        pg_count++;                       }
a12:     unlock(&count_lock);           }
      }
}
```

FIG. 3

```
shared int minval[2];
void recordMinimum ( int * a, int n, int tid){
      int i,min=a[0];
      for (i=0; i ¡ n; ++i){
            if (a[i]¡min) min = a[i];
      }
      if (tid == THREAD_A) {
            L1: minval[0]=min;
      } else {
            L2: minval[1] = min;
      }
} void entry (int * a, int * b) {
      threadExec(recordMinimum, a, 100, THREAD_A);
      threadExec(recordMinimum, b, 200, THREAD_B);
}
```

SYSTEM AND METHOD FOR GENERATING ERROR TRACES FOR CONCURRENCY BUGS

RELATED APPLICATION INFORMATION

This application claims priority to provisional application Ser. No. 60/987,797 filed on Nov. 14, 2007, incorporated herein by reference.

BACKGROUND

1. Technical Field

The present invention relates to computer verification and more particularly to systems and methods for reducing warnings by employing synchronization constraints, sound invariants and model checking.

2. Description of the Related Art

Concrete error traces are critical for debugging software. Unfortunately, generating error traces for concurrency related bugs is notoriously hard. One of the key reasons for this is that concurrent programs are behaviorally complex involving subtle interactions between threads which makes them difficult to analyze. This complex behavior is the result of the many possible interleavings among the local operations of the various threads comprising a given concurrent program.

The development of debugging techniques for concurrent programs is currently an area of active research due to the on-going multi-core revolution. Testing, static analysis and model checking have all been explored but not without drawbacks. Testing has clearly been the most effective debugging technique for sequential programs. However, the key challenge for applying testing to concurrent programs is due the many possible interleavings among threads so that it is difficult to provide meaningful coverage metrics. Furthermore, more often than not, concurrent systems have in-built non-determinism because of which replayability is difficult to guarantee, i.e., the same input may yield different results in different runs of the concurrent program.

The use of static analysis has found some degree of success for standard concurrency bugs like data races and deadlocks. A data race occurs when two different threads in a given program can both simultaneously access a shared variable, with at least one of the accesses being a write operation. Checking for data races is often a critical first step in the debugging of concurrent programs. Indeed, the presence of data races in a program typically renders its behavior non-deterministic thereby making it difficult to reason about it for more complex and interesting properties.

The main drawback of static analysis, however, is that a large number of bogus warnings can often be generated which do not correspond to true bugs. This places the burden of sifting the true bugs from the false warnings on the programmer. From a programmer's perspective, this is clearly undesirable. If the bogus warning rate exceeds a certain threshold programmers may simply abandon the use of such techniques.

Model checking has the advantage that it produces only concrete error traces and thus does not rely on the programmer to inspect the warnings and decide whether they are true bugs. However, the state explosion problem severely limits its scalability. It is unrealistic to expect model checking to scale to large real-life concurrent programs.

SUMMARY

A system and method for program verification includes generating warnings for potential issues in a program. The warnings are filter by performing one or more static analysis methods wherein the static analysis methods are applied in order of overhead expense. Concrete error traces are generated for remaining warnings using model checking.

A system and method for verification of a concurrent program includes performing dataflow analyses on a product control graph to derive sound invariants; removing nodes from the product control graph using derived invariants, where removed nodes correspond to statically unreachable states; and detecting violations of correctness properties using the product control graph for subsequent analysis/verification.

A system for program verification includes a warning generator stored on a computer readable medium and configured, when executed, to analyze a program and to generate potential issues in the program. A warning filter is stored on a computer readable medium and configured, when executed, to perform one or more static analysis methods wherein the static analysis methods are applied in order of overhead expense. A model checker is stored on a computer readable medium and configured, when executed, to generate concrete error traces for remaining warnings using model checking.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 3 is an example program for demonstrating filtering warnings in accordance with the present principles;

FIG. 4 is an example for demonstrating a race-free multithreaded program;

DETAILED DESCRIPTION OF PREFERRED EMBODIMENTS

Figure 1:
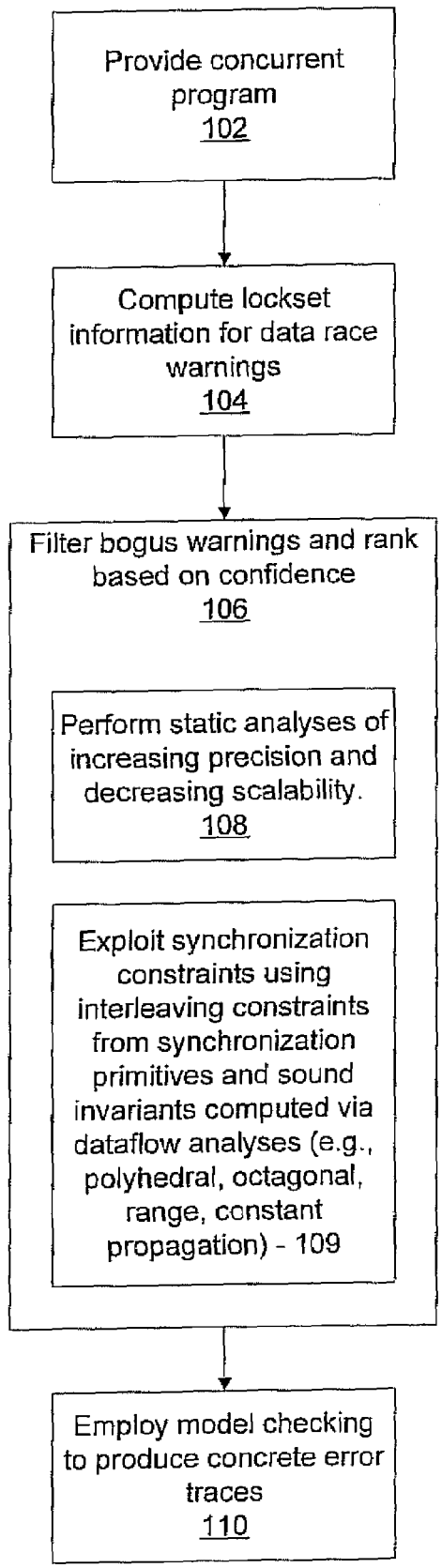
FIG. 1 is a block/flow diagram showing an illustrative system/method for generating concrete error traces for computer verification.

A new framework is provided, which can be referred to as Concurrency Bug Eliminator (CoBE). This framework generates concrete error traces for concurrency bugs. Starting from source code, a goal of CoBE is to produce witnesses accurately, efficiently and in a completely automated fashion. This is accomplished by combining a suite of static analysis techniques with model checking in a manner that leverages their individual strengths while at the same time avoiding their known pitfalls.

Although the present methodology has broad applicability, we chose data race bugs as a vehicle for illustrating the usefulness of the present techniques. For generating concrete error traces for data race bugs, one step is to isolate locations in the given concurrent program where such bugs could arise.

Since the original program could, in general, be large, this initial warning generation should be scalable. Static analysis can be employed here.

Static race warning generation has three main steps. First, determine all control locations in each thread where shared variables are accessed. Next, the set of locks held at each of these locations of interest are computed. Pairs of control locations in different threads where (i) the same shared variable sh is accessed, (ii) at least one of the accesses is a write operation, and (iii) disjoint locksets are held, constitute a potential data race site on sh and a warning is issued. To reduce the number of bogus warnings, we carry out the warning generation context-sensitively. Thus, each warning includes a pair of control locations and their respective thread contexts.

As noted before, the problem with static data race warning techniques is that a lot of bogus warnings can be generated that do not correspond to true bugs. Since static data race detection techniques typically ignore conditional statements in the threads, a pair of control locations marked as a potential data race site may simply be unreachable in any run of the given concurrent program.

While model checking can, in principle, be used to decide whether a pair of controls locations corresponding to a given warning is simultaneously reachable and the warning is a true bug. In practice, model checking suffers from the state explosion problem. Therefore, before we try to exploit model checking to generate witnesses for warnings, we need to leverage techniques that are more sophisticated than just lockset-based methods to weed out more bogus warnings, else the cost of exploring a large number of warnings via model checking (even though in a specified context) will be problematic. In other words, use model checking only as an instrument of last resort.

The embodiments in accordance with the present principles filter bogus warnings that are: fully automatic, sound and complete, and scalable.

Consider a pair of control locations $c_1$ and $c_2$ in threads $T_1$ and $T_2$, respectively, that has been flagged as a potential data race site. This warning is a true bug only if there exists a reachable global state a of the given concurrent program with $T_1$ and $T_2$ in control states $c_1$ and $c_2$, respectively, also termed as pairwise reachability of $c_1$ and $c_2$. To rule out pairwise reachability of $c_1$ and $c_2$. For bogus warnings, we use a series of static analyses of increasing precision but decreasing scalability. The goal being to deduce pairwise unreachability of $c_1$ and $c_2$ as cheaply as possible.

Towards that end, we exploit: 1) Synchronization constraints: We use the fact that concurrent programs use various synchronization primitives like locks, rendezvous (Wait/Notify), broadcasts (Wait/NotifyAll), etc., to restrict the set of allowed interleavings among threads. By simply exploiting these scheduling constraints we show that for many bogus warnings one can statically deduce pairwise unreachability of the corresponding control locations. 2) Sound invariants: we also demonstrate the use of sound analysis such as constant folding and interval, octagon and polyhedral invariants for concurrent programs to deduce pairwise unreachability and hence obtain bogus warning reduction over and above that obtained via the use of synchronization constraints.

Furthermore, the synchronization constraints and sound invariants can, in fact, be synergistically combined to rule out even more warnings than can be accomplished by applying them in isolation. Another step is to leverage model checking for producing concrete error traces for the remaining warnings. Model checking suffers from the state explosion problem which we try to ameliorate by (1) exploring each thread only in the warning-specified context, (ii) using the ability of symbolic techniques to explore large state spaces, (iii) partial order reduction, and (iv) using pairwise unreachability information obtained from synchronization constraints and sound invariants for reducing the set of interleavings that need to be explored. Items (i) and (iv) have, to the best of our knowledge, not been exploited for model checking. The usefulness of our methodology has been demonstrated on a suite of Linux device drivers.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Referring now to the drawings in which like numerals represent the same or similar elements and initially to FIG. 1, a block/flow diagram showing a system/method for debugging a concurrent program in accordance with the present principles is illustratively depicted.

In block 102, a concurrent program is provided to be analyzed. In block 104, statically computed lockset information in the program is employed to generate data race warnings. In block 106, bogus warnings are filtered out and the warnings are ranked based on a degree of confidence. Existing static techniques stop at this stage and rely on programmers to manually inspect the warnings to decide whether it is a true bug or not.

In accordance with the present principles, this burden is removed from a programmer. In block 108, a series of static analyses of increasing precision and decreasing scalability are employed to decide whether a warning is bogus as cheaply as possible. In block 109, these static analyses exploit interleaving constraints arising out of the usage of synchronization primitives, and sound invariants computed via dataflow analyses like constant propagation, and range, octagonal and polyhedral analyses.

In block 110, model checking is leveraged to produce concrete error traces for the remaining warnings. Scalability of model checking is ensured by exploring the same localized part of the program as specified by thread contexts.

The new method has been formulated for generating data race warnings for concurrent software that are (i) applicable to real-life code (ii) scalable, (iii) accurate, and (iv) generate concrete error traces. The new methodology removes the burden from the programmer to a large extent by automatically generating concrete error traces directly from source code with no human intervention. Furthermore, more sophisticated static warning reduction techniques have been provided than are currently in use. Existing techniques are mostly lockset based. The present embodiments go beyond lockset based techniques and leverage many different static analyses to drastically reduce the false warning rate. Using data race bugs as an example, we demonstrate effective strategies for combining static analysis and model checking for generating concrete error traces.

Consider concurrent programs comprised of threads that communicate using shared variables and synchronize with each other using standard primitives such as locks, rendezvous, etc.

Program Representation Each thread in a concurrent program is represented by means of a set of procedures F, a special entry procedure maim and a set of global variables G. Each procedure p∈F is associated with a topic of formal arguments args (p), a return type $t_p$, local variables L(p) and a control flow graph (CFG) representing the flow of control. The control flow graph includes a set of nodes N(p) and a set of edges E(p) between nodes in N(p). Each edge m→n∈E(p) is associated with an action that is an assignment, a call to another procedure, a return statement, a condition guarding the execution of the edge or a synchronization action. The actions in the CFG for a procedure p may refer to variables in the set G∪args(p)∪(p).

A multithreaded program Π includes a set of threads $T_1, \ldots, T_N$ for some fixed N>0 and a set of shared variables S. Each thread $T_1$, is associated with a single threaded program Π, includes an entry function $e_i$. Note that every shared variable s∈S is a global variable in each CFG $\Pi_i$. Threads synchronize with each other using standard primitives like locks, rendezvous and broadcasts. Of these primitives the most commonly used are locks. Rendezvous find limited use in niche applications like web services, e.g., web servers like Apache™ and browsers like Firefox™; and device drivers, e.g., autofs. Broadcasts are extremely rare and hard to find in open source code. We shall, therefore consider concurrent programs comprised of threads synchronizing via locks and rendezvous described below.

Locks.

Locks are standard primitives used to enforce mutually exclusive access to shared resources.

Rendezvous.

Rendezvous are motivated by Wait/Notify primitives of Java and pthread_cond_wait/pthread_cond_send functions of the Pthreads library. The rendezvous transitions of a thread $T_i$, are represented by transitions labeled with rendezvous send and rendezvous receive actions of the form a! and l?, respectively. A pair of transitions labeled with l! and l? are called matching. A rendezvous transition $tr_1$:

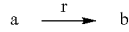

of a thread $T_i$ is enabled in global state a of a concurrent program, iff these exists a thread $T_j$ other than $T_i$ in local state c such that there is a matching rendezvous transition of the form $tr_2$:

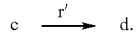

To execute the rendezvous, both the pairwise send and receive transitions $tr_1$ and $tr_2$ must be fired synchronously with $T_1$ and $T_j$ transiting to b and d, respectively, in one atomic step. Note that in Java™, the Notify (send) statement can always execute irrespective of whether a matching Wait statement is currently enabled or not. However, we assume for the sake of simplicity that in the Wait and Notify statements always match up else static warning generation enumerates too many bogus warnings.

Preliminaries: Program Analysis: We now present the basic theory behind dataflow analysis using assertions that characterize the values of program variables at different program points. Since our approach involves reasoning with infinite domains such as integers and reals, we use abstract interpretation as the basis on which such analyses are built. We provide a concise description of abstract interpretation.

Let Π be a CFG representation of a sequential (single threaded) program. For simplicity, we assume that Π includes a single procedure that does not involve calls to other procedures. All the variables involved in Π are assumed to be integers. Each edge in the CFG is labeled with an assignment or a condition. An abstract domain Γ includes assertions φ drawn from a selected assertion language Γ, ordered by a partial ordered inclusion relation ⊆. Each object α∈Γ represents a set of program states [[α]]. For the analysis, we need the following operations to be defined over Γ:

a) Join: Given $\alpha_1, \alpha_2 \in \Gamma$, the join $\alpha = \alpha_1 \cup \alpha_2$ is the smallest abstract object a w.r.t ⊆ such that $$\alpha_1 \subseteq \alpha, \alpha_2 \supseteq \alpha$$

It is used at join points of the CFG.

b) Meet: The meet $\alpha_1 \cap \alpha_2$ corresponds to the logical conjunction; it is applied at conditional branches.

c) Abstract post condition (transfer function) $post_r$ models the effect of assignments. Formally, m→n be an edge in the CFG. The post-condition $post_r$ (m→n,α) computes the smallest object that contains the effect of executing the edge on a program state represented by [[α]].

d) Inclusion test ⊆ check for the termination.

e) Widening operator ∇ to force convergence for the program loops.

f) Projection operator ∃ removes out-of-scope variables.

g) Narrowing operator Δ is used for solution improvement.

Given a program Π and an abstract domain Γ, we seek a map π:L→Γ that maps each CFG location l∈L to an abstract object π(l). Such a map is constructed iteratively by the forward propagation iteration used in data-flow analysis:

$$\pi^0(l) = \begin{cases} T, \text{ if } l = l_0 \\ \bot, \text{ otherwise} \end{cases}$$

and $$\pi^{i+1}(l) = \pi^i(l) \cup \bigcup_{e:m \to l} post_r(\pi^i(m), e).$$

If the iteration converges, i.e., $\pi^{i-1}(l) \subseteq \pi^i(l)$ for all l∈L for some i>0, $\pi^{i+1}$ is the result of our analysis. However, unless the lattice Γ is of finite height or satisfies the ascending chain condition, convergence is not always guaranteed. On the other hand, many of the domains commonly used in program verification do not exhibit these conditions. Convergence is forced by the use of widening and narrowing.

Using abstract interpretation, we may lift dataflow analyses to semantically rich domains such as intervals, polyhedral, shape graphs and other domains to verify sophisticated, data-intensive properties. Over the last 3 decades, there have been many abstract domains, each representing a trade-off between obtaining tractable analyses and proving complex properties.

Interval Constraint Definition. An interval over integers is of the $[l_i, u_i]$ wherein $l_i, u_i \in \cup \pm \infty$ are integers or $\pm \infty$, and $l_i \leq u_i$.

We denote the empty interval by the symbol $\perp$. Let I denote the set of all intervals over Z. The interval domain consists of assertions of the form $x_i \in [l,u]$, associating each variable with an interval containing its possible values.

The domain operations for the interval domain such as join, meet, post condition, inclusion, etc. can be performed efficiently. The interval domain is non-relational. It computes an interval for each variable that is independent of the intervals for the other variables. As a result, it may fail to handle many commonly occurring situations that require more complex, relational invariants. The polyhedral domain computes expressive linear invariants and is quite powerful. However, this power comes at the cost of having exponential time domain operations such as post condition, join, projection and so on. The octagonal domain is a good compromise between the interval and polyhedral domains.

Octagons. The octagon domain due extends the interval domain by computing intervals over program expressions such as x-y, x+y and so on, for all possible pairs of program variables. The domain can perform operations such as post, join and projection efficiently using a graphical representation of the constraints and a canonical farm based on all-pairs shortest-path algorithms.

Figure 2:
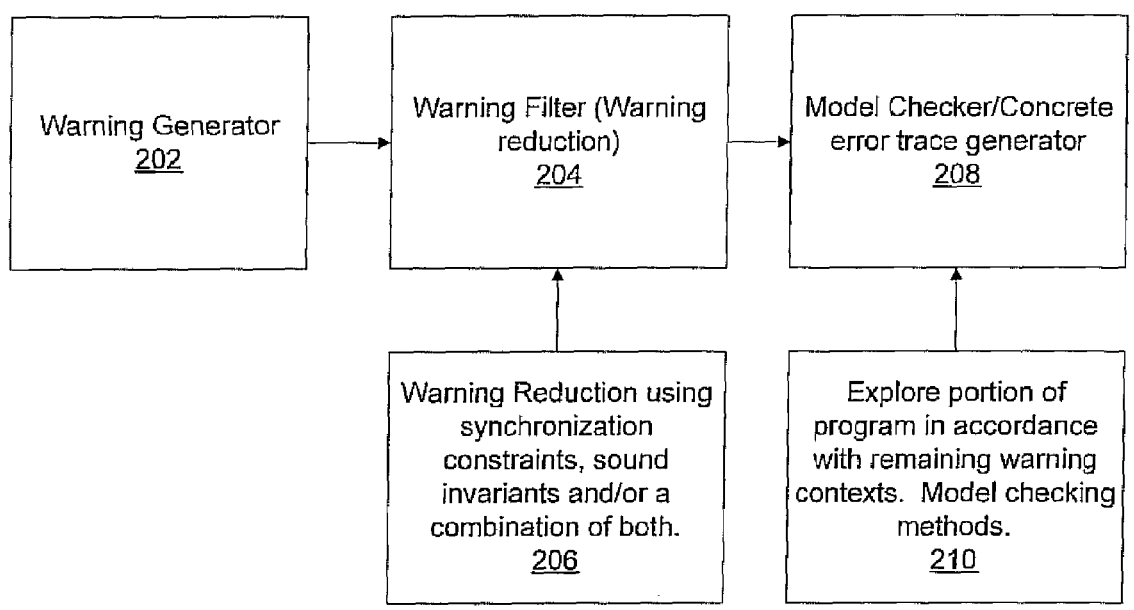
FIG. 2 is a block/flow diagram showing another illustrative system/method for generating concrete error traces for computer verification.

Referring to FIG. 2, a block/flow diagram showing the implementation of a warning reduction and error trace generation system/method is illustratively shown. In block 202, warning generation is provided. Classically, static race warning generation has three main steps. 1) Determine all control locations in each thread where shared variables are accessed. 2) Compute locksets, viz., the set of locks held, at each of these locations. 3) Pairs of control locations in different threads where (i) the same shared variable sh is accessed, (ii) at least one of the accesses is a write operation, and (iii) disjoint locksets are held, constitute a potential data race site on sh and a warning is issued. The notion of an access event is helpful in formally defining data race warnings.

An access event is a tuple of the form (v, T, L, can, a, c), where v is a variable that is read or written at control location c in context con of thread T with lockset (set of locks held) L and access type (read or write) a. Here, context con is defined to be a sequence of function calls starting from the entry function to the one containing location c.

A race warning is a pair of access events $e_1=(v,T_1,L_1,con_1,\alpha_1,c_1)$ and $e_1=(v,T_2,L_2,con_2,\alpha_2,c_2)$ such that v is a shared variable, $L_1 \cap L_2 = 0$ and at least one of $\alpha_1$ or $\alpha_2$ is a write. The key challenges in generating data race warnings are (i) to precisely determine shared variable accesses, and (ii) efficiently compute locksets at control locations corresponding to these accesses. Since our main focus is on techniques to analyze these warnings rather than on their generation, the discussion focuses on a sealable flow and context-sensitive pointer alias analyses.

Bootstrapping. A flow and context-sensitive alias analysis is important to prevent a blow-up in the number of bogus warnings for two main reasons. First, an imprecise points-to analysis will, in general, lead to large points-to sets for shared variables all accesses to which then need to be flagged as potential data race sites. Secondly, since locks are typically accessed via lock pointers, a points-to analysis needs to be carried out to determine locksets. Since, in statically computing locksets we disregard conditional statements, a lock l can be included in the lockset of a locution c only if l is acquired along every path leading to c, referred to as a must lockset of c. Since lock pointers typically point-to different locks in different contexts, the points-to analysis used to compute these locksets is context-sensitive otherwise we may end up producing empty must locksets. This will cause a blowup in the number of bogus warnings.

A flow and context-sensitive alias analysis, however, may not be scalable. To ensure scalability we use a technique called bootstrapping that leverages a combination of (i) divide and conquer, (ii) parallelization and (iii) function summarization. We start by applying the highly scalable Steensgaard's analysis to identify clusters as points-to sets defined by the (Steensgaard) points-to graph. Since Steensgaard's analysis is bidirectional, it turns out that these clusters are, in fact, equivalence classes of pointers. Importantly, these Steensgaard partitions have the property that each pointer can only be aliased to a pointer in the equivalence class containing it. This, in effect, decomposes the pointer analysis problem into much smaller sub-problems where instead of carrying out the context-sensitive analysis for all the pointers in the program, it suffices to carry out separate pointer analyses for each small cluster.

The small size of each cluster then offsets the higher computational complexity of the flow and context-sensitive alias analysis. In case there exist Steensgaard partitions whose cardinality is too large for a context-sensitive alias analysis to be viable (as determined by a threshold size), Andersen's analysis is then performed separately on these large partitions to further reduce the size of each cluster. Note the following.

Localization. For our application interest is in the aliases of lock pointers and shared variables and so the summaries need to be built only for clusters containing at least one lock pointer or shared variable. Since lock pointers alias only to other lock pointers, all pointers in a cluster containing at least one lock pointer will in fact be lock pointers. In other words, we will end up considering clusters comprised solely of lock pointers which are typically not large. This is important to making summary computation scalable. Indeed, without bootstrapping, we would have had to build summaries for all pointers in the program, which clearly would have had limited scalability. Moreover, since lock and shared variable pointers are typically accessed in a small fraction of the total number of functions, it is sufficient to build summaries only for these functions further enhancing scalability.

Parallelization.

Each cluster can be analyzed independently of each other, giving us the ability to leverage parallelization.

In block 204, warning filtration is performed. The main weakness of lockset-based static warning generation techniques is that too many bogus warnings may be generated which places a lot of burden of sifting out the true bugs on the programmer. Methods for sound warning focus on using static techniques to impose an ordering on the warnings wherein a warning $w_1$ is said to be lower than $w_2$ if and only if from the fact that $w_2$ is a real data race one can deduce that in is also a real data race. Then, $w_2$ is discarded in favor of $w_1$. Even though effective, a large pool of warnings may still be left which do not lend themselves to such an ordering-based filtration. Fully automatic, sound and complete and scalable techniques for warning filtration are now described that are more refined and can be used to obtain warning reductions over and above those obtained by lockset-based ordering techniques.

Pairwise Reachability.

Given a race warning $(v,T_1,L_1,con_1,\alpha_1,c_1),(v,T_2L_2,con_2,\alpha_2,c_2)$ in order for it to be a true bug, $c_1$ and $c_2$ must be pairwise reachable, i.e., there must exist a reachable global state s of the concurrent program $T_1 \| T_2$ comprised of the two threads $T_1$ and $T_2$ such that $T_1$ and $T_2$ are, respectively, at control locations $c_1$ and $c_2$ in s. In the language of temporal logic, the problem of checking whether a race warning is a true bug can be formulated as the decision problem $T_1\|T_2\models F(c_1\hat{\ }c_2)$, also termed as pairwise teachability of $c_1$ and $c_2$.

Given a warning, before we consider the use of model checking to validate it as a true bug, we want to try and rule it out using more light-weight, and hence more scalable, techniques. Towards that end, we introduce the notion of static pairwise reachability as the problem of deciding pairwise reachability in the concurrent system comprised of abstractly interpreted versions of threads $T_1$ and $T_2$. The abstract interpretation depends on the static analysis being used for warning reduction. Note that since abstract interpretation typically over-approximates the set of behaviors of the given program, pairwise reachability implies static pairwise reachability, but the reverse does not hold. In other words, if two control states involved in a race warning are not statically pairwise reachable then the warning can be discarded as a bogus one.

Static Pairwise Reachability.

A main goal is identify as many warnings as possible involving control locations $c_1$ and $c_2$ such that $c_1$ and $c_2$ are not statically pairwise reachable. Towards that end, we use a variety of static analysis techniques exploiting both synchronization constraints and sound invariants.

Example

We illustrate our strategy by means of the example concurrent program shown in FIG. 3 wherein different threads may execute the Page_Alloc and Page_Dealloc functions. The counter pg_count stores the number of pages allocated so far. The Page_Alloc routine tries to allocate a new page. If the number of pages already allocated has reached the maximum allowed limit LIMIT, then it waits (a3) until a page is deallocated by the page_dealloc routine and a waiting thread signaled (b3). For brevity, we have used pt_lock, pt_unlock. pt_send, pt_wait for the Pthread functions pthread_mutex _ lock, pthread_mutex_unlack, pthread_cond_send, pthread_ cond_wait.

The shared variable pg_count is accessed at locations a4, a11, b4 and b9. The lockset at locations a4 and b4 is {plk} and at a11 and b9 is {count_lock}. Since these two locksets are disjoint, the pairs of control locations (a4, b11), (a4, b9), (a11, b4) and (b4, b9) are all labeled as sites where potential data races could arise. However, (a4, b9) and (a11, b4) are bogus. Importantly, these warnings can be detected as bogus via simple static analyses as we now illustrate.

In block 206 (FIG. 2), warning reduction employs synchronization constraints and sound invariants to reduce or filter the number of warnings in analyzing a program.

Static Pairwise Unreachability via Synchronization Constraints: Static Pairwise Reachability for Rendezvous: We start by considering the race warning (a4, b9) (FIG. 3). Suppose that we are given a concurrent program comprised only of two threads $T_1$ and $T_2$ executing Page_Alloc and Page_Dealloc, respectively. Note that for locations a4 and b9 to be pairwise reachable, thread $T_1$ has to execute the local sequence x: a1, a2, a3 and a4 whereas thread $T_2$; must execute the local sequence y: b1, b6. b7, b8 and b9. Since the statement at location a3 is a wait statement, $T_2$ must execute a matching send statement, viz., b3, in order for $T_1$ to execute b3. Since b3 is not executed along y, the control locations a4 and b9 are not pairwise reachable in a 2-thread instance and (a4, b9) is therefore not a true data race. In fact, one can also show that it is not a race in a k-thread instance for arbitrary $k \geq 2$.

More generally, locations $c_1$ and $c_2$ in threads $T_1$ and $T_2$, respectively, can be pairwise reachable in $T_1\|T_2$ only if there exist matching sequences of send/wait statements starting from the entry locations $T_1$ and $T_2$, and leading to $c_1$ and $c_2$.

Thus, to remove the above race, we statically compute for each thread T, the language of wait/send sequences from the starting location of T to each location c of interest which we denote by L(c,T). Then, control locations and $c_2$ in threads $T_1$ and $T_2$, respectively, are pair-wise reachable only if $L(c_1, T_1) \cap L'(c_2, T_2) \neq 0$, where L'(c,T) is the language obtained from L(c,con,T) by flipping every wait symbol of the form a? to the matching send a!, and vice versa. In our example, $L(\alpha 4, T_1) = \{pg\_lim?\}$ whereas $L(b9, T_2)$ and hence $L'(b9, T_2)$ both equal $\{\epsilon\}$, where $\epsilon$ is the empty sequence. Since $L(\alpha 4, T_1) \cap (b9, T_2) = 0$, we deduce that (a4, b9) is a bogus warning. Note that we represented statement pt_wait(&pg_lim,&plk) at a3 with the rendezvous wait action pg_lim?.

In general, for recursive programs, the language of waits and sends at a given program location is context-free. Thus, even if we can compute the languages $L_1$ and $L_2$ of send and waits at locations $c_t$ and $c_2$ of interest in $T_1$ and $T_2$, respectively, then checking whether $L_1 \cap L_2' = 0$ is undecidable. To overcome this problem we use two different over-approximation techniques.

Over-approximation via Regular Languages:

Our goal is to compute a regular approximation $L_r$ (C,con, T) of the language of sends/waits at location c in context con of thread T (con is needed as our warning generation is context-sensitive). Essentially, the over-approximation is computed by taking the Kleenestar closure for loops and recursive procedures. Note that, in principle, the CFG $T_c$ of thread T itself can be treated as an automaton with c as the only final state and the entry location of the entry function of T as the initial state. However, since T may synchronize with other threads only at very few locations most transitions in $T_c$ will we empty. We, however, want a small regular automaton accepting $L_r$ (c,con,T) that is efficiently computable (i) for large programs, and (ii) in each context specified by the warnings. To achieve these goals we resort to summarization. Suppose that context con is the sequence of function calls $con = fc_0, fc_1, \ldots, fc_n$ with $fc_i$ being a call to function $f_{i+1}$ in $f_i$. In order to compute $L_r$ (c,con,T), we summarize for each function A, the regular language $L_r$ (en$_i$,$f_e$,$f_i$) from the entry location en$_i$ of $f_i$ to the location $f_c$ of f that is either the call site of a function or a location where a shared variable is accessed. Then, the language $L_r$ (c,con,T) is simply the concatenation $L_r(en_0, call_0, f_0) \cdot L_r(en_1, call_1, f_n) \ldots L_r(en_n, c, f_n)$ where call$_i$ is the call location of $f_{i+1}$ in $f_i$ corresponding to $fc_i$.

Note that recursive functions do not need special handling as they simply result in an SCC in the CFG. Since rendezvous primitives are typically used in a small fraction of functions, $L_r$(en,c,$f$) will include the empty sequence for most locations c in most functions f and so the above procedure is not computationally intensive. Even though the language $L_r$(c, con,T) is computed in a particular context, our construction guarantees that it is still regular and not context-free thereby ensuring that we do not run into the undecidability issues discussed above.

Parameterization:

Instead of checking pairwise reachability in a concurrent program $T_1\|T_2$ comprised of the two threads $T_1$ and $T_2$, we check whether $c_1$ and $c_2$ are parameterized static pair-wise reachable, i.e., whether there exist $n_1, n_2$, such that $c_1$ and $c_2$ are static pairwise reachable in the concurrent program $T_1^{n_1}\|T_2^{n_2}$, comprised of $n_i$ copies of $T_i$. In general, parameterization over-approximates the set of static pairwise reachable control states. Surprisingly, however, the static parameterized pairwise reachability problem is efficiently decidable for thread synchronization using locks and wait notify statements even when the threads are recursive. This is contrary to expectation as, in general, static pairwise reachability is undecidable for programs with a fixed number (even two) of recursive threads.

To sum up, to decide pairwise reachability we (i) either disregard recursion by using regular over-approximations, or (ii) handle recursion precisely but remove the restriction of having a fixed number of (copies of each) threads. Both techniques over-approximate the set of static pairwise reachable states in different ways but accomplish the same goal, viz., a provable tractable technique for deciding static pairwise reachability.

Static Pairwise Reachability for Locks.

A necessary and sufficient condition for static pairwise reachability of threads communicating solely using locks is that static pairwise reachability of $c_1$ and $c_2$ depends not merely on the set of locks held at $c_1$ and $c_2$ being disjoint (which our warning generation already handles) but also on the order in which locks were acquired by thread $T_i$ in order to reach $c_i$. This ordering on the locks is captured using the notion of acquisition histories defined below. Let Lock-Set $(T_i, c)$ denote the set of locks held by thread $T_i$ at control location c.

Acquisition History:

Let x be a global computation of a concurrent program $T_1 \| T_2$ leading to global configuration c. Then, for thread $T_i$ and lock $l \in$ Lock-Set$(T_i,c)$, $AH(T_i,l,x)$ is defined to be the set of locks that were acquired (and possibly released) by $T_i$ after the last acquisition of l by $T_i$ along x.

If L is the set of locks, each acquisition history AH is a map $L \rightarrow 2^L$ associating which each lock a lockset, i.e., the acquisition history of that lock. We say that acquisition histories $AH_1$ and $AH_2$ are consistent iff there do not exist locks $l_1$ and $l_2$, such that $l_1 \in AH_2(l_2)$ and $l_2 \in AH_1(l_1)$. Control states $c_1$ and $c_2$ are statically pairwise reachable iff there exist local paths of threads $T_1$, and $T_2$ leading to $c_1$ and $c_2$, respectively, such that (i) the locksets at $c_1$ and $c_2$ are disjoint, and (ii) the acquisition histories along these local paths are consistent. To exploit this result, we define an AH-augmented access event as a topic of the form (v, T, L, AH, a, c), where (v, T, L, a, c) is an access event and AH is an acquisition history along some path leading to c. These acquisition histories can be tracked via static analysis much like locksets. Since consistency of acquisition histories is a necessary condition for simultaneous reachability, we drop all warnings $(e_1, e_2)$, where $e_i = (v,T,L_i,AH,\alpha_i)$ and $AH_1$ and $AH_2$ are inconsistent.

In block 206 (FIG. 2), warnings are also removed using sound invariants. We consider the warning (b4, a10) in FIG. 3. In this case, we cannot rule out this warning merely by computing the language of sends and waits at b4 and a10. Indeed, the local sequences b1, b2, b3 and b4 and a1, a6, a7, a8, a9 and a11) can be executed concurrently by threads $T_1$ and $T_2$, respectively. This is because unlike the wait statement the notify statement is non-blocking, i.e., can be executed irrespective of whether there exists a thread waiting on it or not. To rule this warning as bogus, we note that at location b4, variables page_count>MAX_COUNT whereas at location a10 we have page_count<MAX_COUNT. Since these conditions are mutually inconsistent, i.e., cannot hold simultaneously, we can deduce that locations a10 and b4 are not simultaneously reachable.

We present several techniques of varying precision and scalability that permit us to compute sound invariants for identifying pairs of control states that are not statically pairwise reachable. These include constant provable, range analysis, octagonal and polyhedral invariants listed in order of increasing precision and decreasing scalability. These techniques are preferably applied in the order listed to use the computationally least expensive technique for removing a given warning.

For example, the above warning could be identified as bogus, by carrying out an octagonal analysis which tracks relations of the form $\pm x \pm y \leq c$ for all necessary pairs of program variables x, y. Note that the octagonal analysis needs to be carried out for the concurrent program instead of the two threads individually. Starting at the initial pair of control states (a1, b1), there two possibilities—either $T_1$ first executes a1 or $T_2$ first executes b1. If $T_2$ first executes b1 then it acquires lock page_limit_mutex which it does not release until after it has executed b4 until which time $T_1$ cannot execute any transition. Thus, for a11 and a4 to be pairwise reachable $T_1$ must execute first. In that case, $T_2$ cannot execute until $T_1$ reaches location a8. Then, at the pair of locations (a8, b1) we see that the octagonal invariant page_count-MAX_PAGES<0 holds due to the conditional statement a6. Now, even if $T_2$ executes b1, the conditional statement at b2 evaluates to false and so $T_2$ cannot execute the if-branch to reach N. Thus the pairs of locations b4 and a1a are not statically pairwise reachable.

Static Pairwise Reachability Using Sound Invariants:

Multithreaded programs avoid unnecessary synchronizations by using simple data invariants that are maintained by the programmer. FIG. 4 shows a simple example of a program with two threads, wherein each thread tries to find the minimum of a local array and write the minimum value into a shared array. Note that the local variable "tid" is used to guarantee race freedom and avoid the need for a lock while accessing the global array "minval". On the other hand, race detection tools based on locksets will warn of an unprotected access on the array elements of "minval".

We demonstrate the use of sound analysis such as constant folding, interval analysis, octagon analysis and polyhedral analysis to prove that the location pairs $\langle L1,L1 \rangle$ and $\langle L1,L1 \rangle$ are simultaneously unreachable. This eliminates the possibility of a race in the program. Our tool can automatically extend to non trivial situations involving complex interactions between local and shared variable using synchronization primitives such as mutexes and semaphores.

Transitions Graphs.

Since invariants involving shared variables could be affected by operations of both threads, we need to take all necessary interleavings of the threads into account. To determine the points in each thread where context switches need to occur, a thread-level conflict analysis is carried out. Based on this analysis, we are able to extract a transaction graph $G_i$ for each thread $T_i$. Each node of $G_i$ represents a code segment of $T_i$. Furthermore, the edges between the nodes in $G_i$ represent the program flow amongst the transactions induced by the control flow in $T_i$; itself. Each transaction is assumed to have a single entry point and possibly many exit points. Each such exit point corresponds to an output edge of the transaction (leading to the entry of a different transaction).

The transaction graph is computed using partial order reduction (POR) which had been used extensively in model checking, the only difference being that now we use POR over the product graph P of the CFGs of the two threads, instead of the state space of the concurrent program. Note that the number of nodes in P is at most a product of the number of lines of source code in the two threads and so P is not large to begin with. By exploiting POR, we can obtain large atomic sections thereby greatly reducing the number of context switches across threads which guarantee robust scalability of our techniques to large programs.

Partial Order Reduction. POR exploits the fact that concurrent computations are partial orders on operations of threads on shared variables. Thus, instead of exploring all interleavings that realize this partial order it suffices to explore just a few (ideally just one). This filtering of interleavings is carried out in a sound and complete fashion by using the concept of persistent sets. A persistent set of a global state captures the subset of enabled transitions that need be explored from that state. Persistent set computation is based on carrying out a conflict analysis on the control locations of the threads constituting the given concurrent program.

Conflict Analysis.

We say that control locations $c_1$ and $c_2$ in threads $T_1$ and $T_2$ respectively, are conflicting if (i) a shared variable sh is accessed at $c_1$ and there is a path x in the CFO of $T_2$ starting at c, and leading to location $d_2$ such that $d_2$ is the first location along x where sh, or (ii) vice versa. If that is the case, we need to explore both interleavings where in the first case $T_1$ executes $c_1$ before $T_2$ executes $d_1$, and in the second case $T_2$, executes $d_2$ (and the entire path x) before $T_1$ executes $c_1$. Thus, all enabled transitions of $T_1$ and all transitions tr of $T_2$ such that there is a path beginning with tr leading to sh being accessed will be included in the persistent set. If, however, we can statically deduce that starting at location ($c_1$, $c_2$), thread $T_2$ cannot reach a location $d_1$ accessing sh with $T_1$ remaining at $c_1$, then we know that even though $c_1$ is currently accessing sh in $c_1$, $T_2$ cannot reach a location accessing sh that can be fired concurrently with $c_1$. Thus, we do no need to include any transitions of $T_2$, in the persistent set.

In other words, if we can deduce that ($c_1$, $d_1$), is not statically pairwise reachable from ($c_1$, $c_2$), then $c_1$ and $c_2$ are not conflicting. We already know how to compute statically pairwise reachable states using synchronization constraints as was shown above. This gives us the initial set of conflicts, which we use to construct the initial transition graph. This graph computed solely using synchronization constraints can be used to compute the initial set of sound invariants. However, based on the sound invariant, we can sometimes prune away unreachable parts of the CFG which permits us to refine our conflict analysis which in turn yields larger transactions and hence smaller transactions graphs. This results in sharper invariants. The whole process is repeated until we reach a fixpoint.

Figure 5:
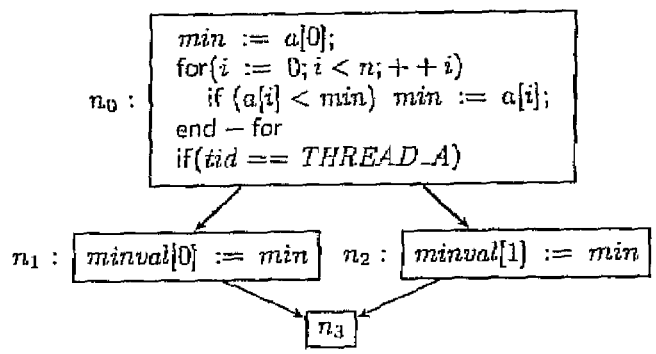
FIG. 5 is a transition graph for the threads of the program shown in FIG. 4.

Referring to FIG. 5, a transaction graph 302 is illustratively shown for the threads in the program described in FIG. 4. The nodes $n_0, n_1, n_2$, represent code segments that can be considered atomic for the purposes of a sound data flow analysis. One goal is to lift the static analysis to the level of multiple threads each executing its transaction graphs.

A product transaction graph $G_\pi$ is obtained by considering the Cartesian product of the transaction graph on each thread $T_i$. Each node is a tuple of transactions. Furthermore, each edge includes the execution of a transaction $m_i$ by a thread $T_i$. Specifically, an edge is of the form $\langle m_1, \ldots, m_i, \ldots, m_k \rangle \rightarrow \langle n_1, \ldots, n_i, \ldots, n_k \rangle$ wherein there is on index i such that $m_j = n_j$, for $j \neq i$ and $m_i \rightarrow n_i \in G_i$.

Figure 6:
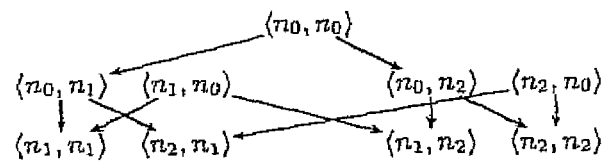
FIG. 6 is a portion of a product control/transition graph for the two threads of the program shown in FIG. 4 where pairs for $n_3$ are not shown.

Referring to FIG. 6, a part of the product transaction graph 310 is illustratively shown (e.g., the nodes involving $n_3$ are not shown) for the running example from FIG. 4. Each edge corresponds to a transaction being executed by one of the threads. For example, the edge $\langle n_1 n_0 \rangle \rightarrow \langle n_1, n_2 \rangle$ denotes the transaction $n_0$ being executed by thread $T_2$, leading to its control residing at the start of the transaction $n_2$.

Note that we do not consider simultaneous execution of transactions by two threads. The conflict analysis guarantees that each such execution is in fact captured by a sequence of single threaded executions.

Flow Analysis for Concurrent Programs.

We assume u two threaded program Π with threads $T_1, T_2$. The shared variables are denoted by S, the local variables in each thread by $L_1, L_2$ (we aggregate all the local variables belonging to all the function). Let $N=\{n_0, \ldots, n_k\}$ denote the transactions of thread $T_1$ and $M=\{m_0, \ldots, m_j\}$ denote the transactions for thread $T_2$. The transaction graphs have the edge sets $E_1, E_2$.

The flow analysis over multiple threads includes a tuple of dataflow facts, one for each thread. For the two thread case, the facts are of the form $\langle \phi_i, \psi_j \rangle$ wherein $\phi_i[S,L_1]$ relates the values of the shared and local variables for thread $T_1$. and $\psi_j[S,L_2]$ for thread $T_2$. Since the programs communicate through shared variables, we require that the set of shared variables described by any pair fife are the same: $(\exists L_1)\phi_i = (\exists L_2)\psi_j$. This consistency condition will be maintained throughout the analysis.

As a primitive, given an assertion $\phi[S,L]$ over the global and the local variables, and a transaction $n_i$, we use the abstract interpretation technique described above to compute output assertions $n_i$. Let $\psi_1, \ldots, \chi_m$ at the output edges of the transaction $n_i$. Let $\Im(\phi, n_i)$ denote the result of propagating an assertion $\phi$ across a transaction $n_i$ to obtain output assertions denoted by $\Im(\phi, n_i)\lfloor n_j \rfloor$ at the edge $n_1 \rightarrow n_j$. Note that while computing $\Im(\phi, n_i)$, the second thread may be assumed not to execute.

Melding. An elementary step includes propagating an assertion pair $\langle \phi_i, \psi_j \rangle$ across a transaction $n_i$ (the execution of a transaction by thread $T_2$ is handled similarly). Let $\phi_k$ denote the result of forward propagation $\Im(\phi_i, n_i)[n_k]$ for some exit node $n_k$.

Note that in doing so, the shared variables G may be modified. Therefore, even though thread $T_2$ is silent during the move, its global state may nevertheless be affected as a result of the move. As a result, we need to modify the global state of $\psi_j$ to coincide with that of the result $\phi_i'$.

To do so, we introduce an operator meld($\phi_k, \psi_j$) that forces the global state values represented by $\psi_j$ to coincide with those in $\phi_k$. Meld can be defined as follows. Let $\phi[S,L_1]$ and $\psi[S, L_2]$ be assertions over shared and local variables for each thread. The assertion $\gamma$:meld($\phi, \psi$) is such that:

1. $\gamma$ is an assertion over $S \cup L_2$.
2. $(\exists L_1)\phi \equiv (\exists L_2)\gamma$.
3. $(\exists G)\psi \models (\exists G)\gamma$.
4. The operator must be entry-wise monotonic, i.e., if $\phi_1 \models \phi_2$ and $\psi_1 \models \psi_2$ then
meld($\phi_1, \psi_1$) $\models$ meld ($\phi_2, \psi_1$), meld($\phi_1, \psi_1$) $\models$ meld($\phi_1, \psi_2$).

In other wards, the new assertion $\gamma$ is an over-approximation of the global variable values described by $\phi$ and the local variable values described by $\psi$. To summarize, the effect of executing a transaction $\langle n_i, m_i \rangle$ starting from the initial states described by the assertion $\langle \phi_i, \psi_j \rangle$ for the edge $n_i \rightarrow n_k$ is given by the assertion pair $\langle \phi_k, \psi'_j \rangle$ wherein $$\phi_k : \Im(n_i, \phi_i)[n_k], \psi'_j : \text{meld}(\phi_k \psi_j)$$

Formally, we use a propagation operator "propagate" to model the effect of executing a transaction $n_i$ across an edge $n_i \rightarrow n_k$: propagate $(\langle \phi_i, \psi_j \rangle, n_i \rightarrow n_k) = \langle \phi_k, \psi'_j \rangle$.

A goal is to produce a map 77 labeling each node of the product graph $(n_i, m_j)$ with a pair of assertions $\eta(n_i, m_j): \phi_i, \psi_j$, such that $\phi_i[n_i, m_j]$ relates the shared variables S with the local variables $L_1$, and similarly $\psi_j$. Secondly, each of the assertions $\langle \phi_i, \psi_j \rangle$ hold, whenever the individual thread controls simultaneously reside in the nodes $\langle n_i, m_j \rangle$.

Formally, for any edge $\langle n_i, m_j \langle \rightarrow \rangle n_i', m_j \rangle$, (we need that:

$$\text{propagate}(\eta(n_i,m_j), n_1 | = n_i') | = \eta(n_i', m_j).$$

A symmetric condition needs to hold for moves of the thread $T_2$. The map $\eta$ can be constructed using forward propagation on the product graph G using propagate as the post-condition.

Product Graph Forward Propagation.

Forward propagation on the product graph uses the same method as that on a single threaded CFG, with the exception that each post condition (transfer function) is now a full fledged analysis of a transaction code segments of one of the threads. Secondly, forward propagation uses a meld operator to be defined. We now show that a simple melding operator can be constructed using projection and works for domains wherein the conjunction $\cap$ coincides with the logical conjunction $\wedge$ (i.e., more closed domains). Formally, we have $$\text{meld}(\phi,\psi) := (\exists L_1)\phi \wedge (\exists G)\psi.$$

It can be shown that if an abstract domain permits projection and conjunction, then the formula defined above provides the best possible meld operator.

Combining Synchronization Constraints and Sound Invariants.

We now show how to synergistically combine synchronization constraints and sound invariants to rule out more warnings than can be accomplished by applying the two techniques individually. This is also performed in block 206 of FIG. 2.

Method 1:

1. Given a pair of threads $T_1$ and $T_2$, construct an initial transition graph $T_0$ by using lock and rendezvous constraints.
2. Repeat:
3. Compute range, octagonal polyhedral invariants and if possible, prune paths from Ti resulting in $T_{i+1}'$.
4. Recompute the transition graph $T_i$ using synchronization constraints on the pruned transition graph $T_i'$.
5. until $T_{i+1} = T_i$
6. return $T_i$ In general, we can iteratively refine a synchronization skeleton by alternately leveraging synchronization constraints and sound invariants until we reach a fix-point. As method 1 prunes out the transition graph it permits us to both refine the sound invariants as well as reduce the number of conflicts. Conflict reduction, in turn, permits us to identify large transactions, viz., atomic section of code, thereby reducing the number of context switches. The resulting transition graph can be used not just for warning reduction but for any analysis of concurrent programs including dataflow analysis, like pointer alias analysis and model checking among others. In that sense the present techniques have much broader applicability.

In block 208, concrete error traces are generated, e.g., by a model checker. This preferably includes using model checking and static analyses. This step is to leverage model checking for producing concrete error traces for the warnings left after filtration in block 204. Model checking suffers from the state explosion problem which we try to ameliorate by (i) exploring each thread only in the warning specified context, (ii) using the ability of symbolic techniques to explore large state spaces, (iii) partial order reduction, and (iv) using transition graphs computed from synchronization constraints and sound invariants for reducing the set of interleavings that need to be explored. We start by building a circuit-based model of the given concurrent program by first building a circuit for each thread and then composing them together via a scheduler.

Translating Individual Threads into Circuits.

The circuit for each thread is obtained under the assumption of bounded data and bounded control (recursion). We start by flattening all arrays and structs, replacing them with collections of simple scalar variables, and building an internal memory representation of the program by assigning to each scalar variable a unique number representing its memory address. Variables that are adjacent in program memory are given consecutive memory addresses in our model; this facilitates modeling of pointer arithmetic. We model the heap as a finite array, adding a simple implementation of malloc( ) that returns pointers into this array.

The simplified program includes scalar variables of simple types (Boolean, enumerated, integer). The CFG of the simplified program can now be viewed as a finite state machine with state vector (pc, V), where pc denotes an encoding of the basic blocks, and V is a vector of integer-valued program variables. We then construct symbolic transition relations for pc, and for each data variable appearing in the program. For pc, the transition relation reflects the guarded transitions between control locations in the CFG. For a data variable, the transition relation is built from expressions assigned to the variable in various thread locations. Finally, we construct a symbolic representation of these transition relations resembling a hardware circuit. For the pc variable, we allocate $\lceil \log N \rceil$ latches, where N is the total number of basic blocks. For each program variable, we allocate a vector of n latches, where n is the bit width of the variable. At the end, we obtain a circuit-based model of each thread of the thread, where each variable is represented in terms of a vector of binary-valued latches and a Boolean next-stale function (or relation) for each latch.

Warning Specific Modeling.

Since each warning specifies a context we inline all functions in this context and slice away the remaining thread. In this way, we explore only part of the program specified by the warning contexts remaining after filtration in block 210. In lining greatly improves the impact of all the static analyses that we use for model reduction like program slicing, range analysis, constant propagation, etc. However, the largest impact of exploring the thread in a particular context occurs in the memory modeling.

In general, for handling pointer accesses, we first perform a Steensgaard points-to analysis to determine the set of variables that a pointer variable can point to. Then, we convert each indirect memory access, through a pointer or an array reference, to a direct memory access. For example, if we determine that pointer p can point to variables a, b, . . . , z at a given program location, we rewrite a pointer read *(p+i) as a conditional expression of the form ((p+i)==&a?a: ((p+i)==&b % b: . . . )), where &a, &b, . . . are the numeric memory addresses we assigned to the variables a, b respectively.

An indirect assignment *(p+i)=e can be replaced by the series of conditional assignments a=((p+i)=&a?e:a); b=((p+i)=&b?e:b); . . . . Exactly one of these assignments will have an effect during execution. Note that since the number of assignments is equal to the cardinality of the points-to set a, b, . . . z, the size of the points-to set or indirectly the accuracy of the points-to analysis has a direct impact on the size of the resulting circuit model. Since we inline the functions in a warning-specified context, we can, using bootstrapping, compute flow and context-sensitive points-to sets in that contexts which are much smaller than Steensgaard points-to sets. T his is one of the reasons why model checking in a specified context is much more scalable.

Building the Circuit for the Concurrent Program.

Given the circuit $C_i$ for each individual thread $T_i$, we now show how to get the circuit C for the concurrent program CP comprised of these threads. In the case where local variables with the same name occur in multiple threads, to ensure consistency we prefix the name of each local variable of thread $T_i$ with thread_i. Next, for each thread $T_i$ we introduce a gate execute_i indicating whether $P_i$ has been scheduled to execute in the next step of CP or not.

For each latch 1, let next-state$_i$(l) denote the next state function of l in circuit $C_i$. Then in circuit C, the next state value of latch thread_i_l corresponding to a local variable of thread $T_i$, is defined to be next-state$_i$(thread_i_l) if execute_i is true, and the current value of thread_i_l, otherwise. If, on the other hand, latch l corresponds to a shared variable, then next-state(l) is defined to be next-state$_i$Q(l), where execute_i is true. Note that we need to ensure that execute_i is true for exactly one thread $T_i$. Towards that end, we implement a scheduler which determines in each global state of CP which one of the signals executed is set to true and thus determines the semantics of thread composition.

Conditional Stubborn Sets based Persistent Sets.

To incorporate partial order reduction, we need to ensure that from each global state s, only transitions belonging to a conditional stubborn set of s are explored. Let R and $R_i$, denote the transitions relations of CP and $T_i$, respectively. If CP has n threads, we introduce the n-bit vector cstub$_i$ which identifies a conditional stubborn set for each global state s, i.e., in s, cstub$_i$ is true for exactly those threads $T_i$ such that the (unique) transition of $T_i$ enabled at s belongs to the same minimal conditional stubborn set of s. Then, $$R(s, s') = \bigvee_{1 \leq i \leq n} ((\text{execute\_i}) \wedge cstub_i(s) \wedge R_i(s, s')).$$

We have presented effective strategies for combining static analysis and model checking to generate concrete error traces for data races. These static analyses exploit interleaving constraints arising from the usage of synchronization primitives like locks, rendezvous, etc., as well as sound invariants computed via dataflow analyses like constant propagation and range, octagonal and polyhedral analyses. The present techniques are applicable to not just bogus warning reduction but the analysis of concurrent programs at large.

Having described preferred embodiments of a system and method for generating error traces for concurrency bugs (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method implemented in a computer system for verification of a concurrent program, the method comprising:
    removing statically unreachable nodes using constraints due to synchronization primitives on a product control graph;
    performing static program analyses on the product control graph to derive sound invariants;
    further removing statically unreachable nodes using the derived invariants; and
    detecting violations of correctness properties using a resulting product control graph for subsequent analysis or verification.

2. The method as recited in claim 1, wherein removing statically unreachable nodes and performing static program analyses are iteratively repeated, until no more nodes can be removed.

3. The method as recited in claim 1, wherein the product control graph is constructed over control states corresponding to transaction boundaries in the threads or processes of the concurrent program.

4. The method as recited in claim 1, wherein the static program analyses include one or more of constant propagation, range analysis, octagonal analysis and polyhedral analysis for concurrent programs.

5. The method as recited in claim 4, wherein different static program analyses are performed in order of increasing levels of precision offered by the analyses.

6. The method as recited in claim 1, wherein the static program analysis is performed using abstract interpretation over concurrent programs.

7. The method as recited in claim 6, wherein the abstract interpretation uses a meld operation to maintain consistency over states shared between different threads or processes of the concurrent program.

8. The method as recited in claim 1, wherein the product control graph is constructed over control states corresponding to transaction boundaries in threads or processes of the concurrent program.

9. The method as recited in claim 1, wherein paths in the product control graph that correspond to potential violations of correctness properties are reported as warnings.

10. The method as recited in claim 9, where subsequent analysis or verification is performed only on program slices corresponding to the warnings.

11. The method as recited in claim 1, wherein subsequent analysis or verification includes using model checking to generate execution traces that show violations of correctness properties.

12. The method as recited in claim 11, wherein invariants derived by dataflow analyses are used to improve scalability of model checking via state space reduction.

13. The method of claim 1, wherein said program verification is for detecting bugs in concurrent programs, said method comprising:
    generating warnings, corresponding to potential errors, in a concurrent program;
    filtering out bogus warnings by performing, via said steps of removing, performing, further removing and detecting, one or more static program analysis methods for concurrent programs wherein the static program analysis methods are applied in order of overhead expense; and
    generating concrete execution traces for remaining warnings using model checking.

* * * * *